(12) United States Patent
Agostini et al.

(10) Patent No.: US 9,524,564 B2
(45) Date of Patent: Dec. 20, 2016

(54) METHOD FOR VIEWING A MULTI-SPECTRAL IMAGE

(71) Applicant: Sagem Défense Sécurité, Boulogne-Billancourt (FR)

(72) Inventors: Eric Agostini, Boulogne-Billancourt (FR); Maxime Thiebaut, Boulogne-Billancourt (FR); Nicolas Roux, Boulogne-Billancourt (FR); Philippe Foubert, Boulogne-Billancourt (FR); Thierry Touati, Boulogne-Billancourt (FR)

(73) Assignee: Sagem Defense Securite, Boulogne-Billancourt (FR)

( * ) Notice: Subject to any disclaimer, the term of this patent is extended or adjusted under 35 U.S.C. 154(b) by 0 days.

(21) Appl. No.: 15/027,996

(22) PCT Filed: Sep. 25, 2014

(86) PCT No.: PCT/FR2014/052405
§ 371 (c)(1),
(2) Date: Apr. 7, 2016

(87) PCT Pub. No.: WO2015/052402
PCT Pub. Date: Apr. 16, 2015

(65) Prior Publication Data
US 2016/0275698 A1    Sep. 22, 2016

(30) Foreign Application Priority Data

Oct. 7, 2013  (FR) ..................... 13 02324

(51) Int. Cl.
*G06T 7/40* (2006.01)
*G06T 11/00* (2006.01)

(52) U.S. Cl.
CPC .......... *G06T 7/408* (2013.01); *G06T 11/001* (2013.01); *G06T 2207/10024* (2013.01)

(58) Field of Classification Search
CPC ............... G06K 2009/0064; G06K 2009/6236
(Continued)

(56) References Cited

U.S. PATENT DOCUMENTS 7,386,165 B2 *  6/2008  Dundar ............... G06K 9/6256
                                                       382/128
7,593,587 B1 *  9/2009  Rosario ............... G06K 9/0063
                                                       348/208.4
(Continued)

FOREIGN PATENT DOCUMENTS

FR          2982393 A      10/2013

OTHER PUBLICATIONS

Heesung et al. Projection-Based Adaptive Anomly Detection for Hyperspectral Imagery, IEEE 0-7803-7750-8/03, 2003, pp. 1-3.*
(Continued)

*Primary Examiner* — Ishrat I Sherali
(74) *Attorney, Agent, or Firm* — Christensen O'Connor Johnson Kindness PLLC (57) ABSTRACT

The inventive method for viewing of a multi-spectral image by an operator uses contrast optimization by Fisher projection. The Fisher projection is determined and applied within a window (F1, F2, F3, . . . ) that is smaller than a display screen matrix (1) used by the operator. The window is moved for successive updates of a depiction of the image that is displayed, while creating a remanence of the positions of the earlier windows and elements that were exposed in some of said earlier windows. The implementation of the method is particularly simple and intuitive for the operator, so as to improve the reliability and effectiveness of his or her monitoring.

18 Claims, 5 Drawing Sheets

(58) Field of Classification Search
USPC .................................................. 382/162, 167
See application file for complete search history.

(56) References Cited

U.S. PATENT DOCUMENTS

| 9,384,414 B2* | 7/2016 | Roux ................... G06K 9/0063 |
| 2006/0055710 A1 | 3/2006 | Lo et al. |
| 2014/0321753 A1 | 10/2014 | Roux et al. |

OTHER PUBLICATIONS

Goudail, F., et al., "Some Practical Issues in Anomaly Detection and Exploitation of Regions of Interest in Hyperspectral Images," Applie Optics 45(21):5223-5236, Jul. 2006.
International Search Report mailed Dec. 10, 2014, issued in corresponding International Application No. PCT/FR2014/052405, filed Sep. 22, 2014, 4 pages.
Written Opinion of the International Searching Authority mailed Dec. 10, 2014, issued in corresponding International Application No. PCT/FR2014/052405, filed Sep. 22, 2014, 21 pages.
International Preliminary Report on Patentability mailed Jan. 4, 2016, issued in corresponding International Application No. PCT/FR2014/052405, filed Sep. 22, 2014, 27 pages.

* cited by examiner

METHOD FOR VIEWING A MULTI-SPECTRAL IMAGE

The present invention relates to a method for viewing a multispectral image, as well as to a device and a computer program for implementing such a method.

Monitoring an environment is a common task, particularly in order to detect intrusions. Such monitoring has particular difficulties when carried out in a terrestrial environment. A terrestrial environment such as a rural area may contain a large number of distinct elements with irregular contours such as trees, bushes, rocks, buildings, etc, which makes it complex to interpret an image and search for intruding elements. In addition, in certain circumstances such as military surveillance, an intruding element may be camouflaged to make it more difficult to detect in the landscape. Commonly, such camouflage is effective against observation under visible light, particularly for wavelengths between 0.45 µm (micrometers) and 0.65 µm, and more particularly near 0.57 µm which corresponds to the maximum sensitivity of the human eye.

To successfully detect the intruding element, which is also called the larger in the terminology of persons skilled in the art, despite a complex landscape and a possibly camouflaged target, it is known to perform a multispectral observation of the environment. Such multispectral observation consists of simultaneously capturing multiple images of the same landscape in different spectral bands, so that a target that does not clearly appear in images captured in some spectral bands is revealed by images corresponding to other spectral bands. Each spectral band may be narrow, with a wavelength range of a few tens of nanometers, or wider, possibly even very wide with a width of several micrometers, particularly when the spectral band is in one of the infrared domains: between 3 µm and 5 µm or between 8 µm and 12 µm. It is well known that observation in the wavelength range between 0.8 µm and 1.2 µm can be effective for revealing a target in an environment containing plant growth, when the target is effectively camouflaged against detection by observation within the light range visible to the human eye.

However, such multispectral detection may still be insufficient for an operator responsible for monitoring to detect the presence of a target in a terrestrial environment. Indeed, in certain circumstances, none of the images that are separately associated with the spectral bands reveal the target dearly enough for the monitoring operator to detect the target in these images, considering the observation time allotted. Hereinafter, each image which separately corresponds to one of the spectral bands is called the spectral image. For such situations, it is also known to improve the effectiveness of target detection by presenting the operator with an image constructed by Fisher projection. Such a process is known in particular from the article "Some practical issues in anomaly detection and exploitation of areas of interest in hyperspectral images", Goudail F. et al, Applied Optics, Vol. 45, No. 21, pp. 5223-5236. According to this method, the image presented to the operator is constructed by combining at each point of the image, called a pixel, the intensity values that are separately captured for a plurality of spectral bands, so as to optimize a contrast of the resulting image. Theoretically, this image construction consists of projecting for each pixel the vector of the intensities that have been captured for the spectral bands selected, in an optimal direction in the multidimensional space of the spectral intensity values. This optimal projection direction can be determined from the covariance matrix of the spectral intensities, estimated over the entire image field. In effect this means searching for a maximum correlation between the intensity variations that are present in the different images captured in the spectral bands selected. The contrast of the image presented to the operator is thus at least equal to that of each separate spectral image, such that detection of the target by the operator is both more efficient and more reliable. Alternatively, the optimal projection direction may be searched for directly by using a conventional optimization algorithm to maximize image contrast by varying the projection direction in the multidimensional space of the spectral intensities.

However, determining the direction of the Fisher projection for the entire image field and then applying it to this same entire image field is a significant amount of calculation which is incompatible with real-time execution during an environmental monitoring. In addition, the calculation time is further increased when the calculations are executed using a portable or mobile device, of limited computational capacity. Due to this overly long calculation time, it is known to restrict the contrast enhancement by Fisher projection to a window within the image that is smaller than the entire image. The calculation time is thus reduced by decreasing the number of pixels to be processed, and becomes compatible with real-time execution during an environmental monitoring.

The monitoring operator selects the window within the complete image, particularly its position, based on the nature of the environment at that location in the image, and on his or her desire to intensify the search for a potential target in that area. To facilitate such a selection of the window position, and also to facilitate the identification and the nature of an intrusion occurring in that area, it is also known to present the operator with a composite image on a screen. Such a composite image may be formed of one of the spectral images, outside the window, and of the portion of the multispectral image resulting from the Fisher projection, within the window. Alternatively, multiple spectral images whose wavelength ranges lie within the range of sensitivity of the human eye can be used to display a representation of the landscape in natural or almost natural colors outside the window. The operator can thus easily orient himself or herself within the image, when placing the window at the desired location so that the content of the multispectral image at that location appears with enhanced contrast in the representation. This enhanced contrast is provided by the Fisher projection performed within the window.

In such a viewing method, the operator selects successive windows within the image, and when a new window is selected after a previous window, the initial mode of representation of the image which is used outside the window is restored for the pixels located inside the previous window and now located outside the new window. Under these conditions, the operator may forget the location of a window previously selected, in particular if he or she has selected several other windows afterwards. The operator may also forget the content of the multispectral image revealed in one of the first windows selected. His or her exploration of the multispectral image by successive windows therefore becomes random, and it is thus possible for the operator not to identify an intrusion in the landscape simply because he or she has unwittingly never placed the window at the right location in the complete image.

A general object of the invention therefore consists of making the exploration of the multispectral image more reliable, by using windows that are successively selected by the operator, in order to reduce the risk that an intruding element is not detected. In other words, the invention generally aims to further reduce the probability of non-detection of an intruding element in a scene that is captured in multispectral images.

In particular, the invention aims to prevent an area of the image from never having a window selected there by the operator, inadvertently or because he or she mistakenly believes a window has already been placed there. For this, the invention aims to leave a trace of the windows already selected, in the representation of the scene presented to the operator.

An optional object of the invention may consist of leaving a trace in the representation of the scene that is presented to the operator, of patterns that were revealed within a window and that have again become indistinguishable when a new window has been selected elsewhere in the image.

A further object of the invention is to provide an improved method for viewing multispectral images which is compatible with real-time reception of a video stream from a camera used to capture these multispectral images.

To achieve some of these or other aims, a first aspect of the invention provides a method for the viewing, by an operator, of a multispectral image formed of a plurality of spectral images of a same scene that were captured at a same moment in separate respective spectral ranges, the method comprising the following successive steps:
/1/ defining a combination operation for combining two intensity values, to produce a new intensity value resulting from the combination;
/2/ on a screen comprising a matrix of pixels presented to the operator, displaying a representation of the scene consisting of initial intensity values respectively assigned to all the pixels of the matrix, and which are obtained on the basis of at least one of the spectral images;
/3/ for a first window which is smaller than the matrix, and for a selection of several spectral images, determining a Fisher projection from the intensity values of the selected spectral images in order to optimize a contrast of a linear combination of spectral images of the selection within the first window;
/4/ for each pixel within the first window, calculating an intermediate intensity value by performing the following sub-steps:
/4-1/ applying the Fisher projection determined in step /3/ to portions of the selected spectral images which are contained in the first window, so as to obtain a raw projection value for each pixel of the first window; then
/4-2/ converting the raw values obtained in sub-step /4-1/, using a monotonic conversion function, such that a smallest and largest value among these raw values are respectively equal to a lower bound and an upper bound of a fixed interval;
/4-3/ calculating a contrast within the first window, from the raw values obtained in sub-step /4-1/; then
/4-4/ for each pixel within the first window, calculating the intermediate intensity value by multiplying the converted raw value obtained in sub-step /4-2/ for that pixel, by the contrast obtained in sub-step /4-3/;
/5/ updating the representation of the scene that is displayed on the screen by replacing, for at least some of the pixels contained in the first window, the initial intensity value by the intermediate intensity value calculated in step /4/;
/6/ repeating steps /3/ and /4/ for a second window which is also smaller than the matrix, different from the first window and having pixels in common therewith, and for the same selection of spectral images; and
/7/ once again updating the representation of the scene which is displayed on the screen, in the following manner, based on the representation obtained at the end of step /5/:
/7-1/ for at least some of the pixels within the second window but not part of any previously selected window: replacing the initial intensity value by the intermediate intensity value calculated in step /6/;
/7-2/ for at least some of the pixels within the second window but which are also part of at least one previously selected window: replacing the intensity value used in step /5/ by the new intensity value resulting from the combination operation applied to the intensity value used in step /5/ and to the intermediate intensity value calculated in step /6/; and
/7-3/ for each pixel outside of the second window: keeping the intensity value used in step /5/.

The contribution of the invention over known viewing methods resides in sub-steps /7-2/ and /7-3/, with the combination operation initially defined. Indeed, a trace of the representations resulting from previous windows is maintained in the representation of the multispectral image which is now displayed. Thus, the representation is progressively enriched while maintaining visibility of the positions of previously selected windows, and of image elements which may have been revealed in these earlier windows. In other words, each new representation no longer occurs by replacing previous ones, but by supplementing them. In this manner, the representation of the scene shown to the operator contains multispectral image information which is progressively enhanced or enriched.

The invention is particularly advantageous when several or numerous windows are successively selected. The sequence of steps /6/ and /7/ is then repeated with windows that change between two successive repetitions. With each repetition of this sequence, step /6/ is re-executed using the same spectral images already selected, but for the new window. The representation of the scene is then updated in step /7/ based on the representation of the scene as obtained at the end of the step /7/ executed during the previous repetition, and using the intermediate intensity values of step /6/ of the current repetition. The successive windows, and the elements of the multispectral image which may have been revealed in them, are preserved in the updated representation as a persisting afterimage. The monitoring operator therefore continues to know with certainty the locations in the complete image where he or she has already selected windows, as well as the patterns that were then revealed. The method of the invention therefore has an implementation that is particularly simple and intuitive for the operator, in order to increase the ergonomics of a monitoring task, and therefore its effectiveness and reliability.

The benefit of the invention is even more apparent when successive windows have significant and numerous overlaps. Indeed, in some circumstances an intruding element which is present in the scene is only revealed for a window which is located precisely at the location of this element in the image.

In addition, one or more of the following improvements may be used in preferred implementations of the method of the invention, independently or in combination:
the combination operation may be defined in step /1/ such that the new intensity value is equal to the larger of the two intensity values which are combined;

each spectral image used in step /2/ to obtain the initial intensity values, may correspond to a spectral range which is contained within a range of sensitivity of the human eye. Even more preferably, a plurality of such spectral images may be used, such that the representation of the scene displayed in step /2/ corresponds to color vision of the human eye in daylight conditions;

the windows that are used for the successive repetitions of the sequence of steps /6/ and /7/ may each be determined by the operator who is watching the screen;

at least some of the windows that are used for the successive repetitions of the sequence of steps /6/ and /7/ may be selected automatically on each side of a path of travel within the matrix, this path being determined by the operator who is watching the screen;

some of the windows that are used for the successive repetitions of the sequence of steps /6/ and /7/ may be determined by the operator, and for each window determined by the operator, the sequence of steps /6/ and /7/ may also be repeated for eight additional windows arranged in the matrix such that target areas respectively located within the eight additional windows have a side or corner that is contiguous with a target area in the window determined by the operator;

some of the windows that are used for the successive repetitions of the sequence of steps /6/ and /7/ may be determined by the operator, and for each window determined by the operator, the sequence of steps /6/ and /7/ may also be repeated for four additional windows aligned with the window determined by the operator along a column direction of the matrix, so as to form a stack of contiguous windows distributed symmetrically on either side of the window determined by the operator, and such that the target areas respectively located within the windows of the stack form contiguous pairs;

a portion of the pixels in the window being used for the current repetition of the sequence of steps /6/ and /7/ may be marked in response to a first command entered by the operator. In this case, the marked pixels may be displayed with a predetermined color. Optionally, these marked pixels may be the pixels, contained in the window being used for current repetition of the sequence of steps /6/ and /7/, which have intensity values greater than a first threshold in the representation of the scene as updated at the end of the current repetition of the sequence of steps /6/ and /7/;

the representation of the scene displayed in step /2/, with the initial intensity values, may be displayed once again in response to a second command entered by the operator, and then the viewing method can be resumed from step /3/. During such a reset of the representation, marking of the pixels as initiated by the operator by a first command entered prior to the second command, may be preserved; and in step /5/ and in sub-step /7-1/, the initial intensity value may be replaced by the intermediate intensity value if the latter is greater than a second threshold adopted for the current window, otherwise the initial intensity value can be maintained but is affected by a level of transparency that is determined based on the intermediate intensity value. Similarly, in sub-step /7-2/, the new intensity value resulting from the combination may also only be used for the replacement if it is greater than the second threshold, otherwise the intensity value resulting from the previous repetition of the sequence of steps /6/ and /7/ can be maintained but is affected by a level of transparency that is determined based on the new intensity value. Possibly, the second threshold may be determined from a statistical evaluation of the intermediate intensity values for the pixels that are part of a background area in the window used for the current repetition of the sequence of steps /6/ and /7/.

The windows that may possibly be added to the selection made by the operator are intended to produce a more complete scan of the scene. Thus, the viewing method becomes more robust for areas of the image that could have been omitted when selecting windows.

A second aspect of the invention relates to a device for viewing a multispectral image, which comprises:
  means for storing the multispectral image;
  a screen comprising a matrix of pixels;
  an image processing system which is adapted for combining intensity values assigned to the pixels in each spectral image;
  a control system which is adapted for displaying on the screen a representation of the scene produced by the image processing system; and
  a system for selecting a window in the matrix, the selected window being smaller than the matrix.

Such a device is adapted for implementing a viewing method according to the first aspect of the invention. The image processing system and the control system may advantageously be composed of a graphical processor, designated by GPU, or by a programmable logic circuit, as designated by FPGA.

Finally, a third aspect of the invention concerns a computer program which comprises program instructions stored on a medium readable by one or more processors and adapted to cause this or these processors to execute a viewing method according to the first aspect of the invention.

Other features and advantages of the invention will become apparent from the following description of some non-limiting examples of its implementation, with reference to the accompanying drawings in which.

For clarity, the dimensions of elements represented in certain figures do not correspond to actual dimensions nor to actual dimension ratios. In addition, identical references used in different figures denote identical elements or elements that have identical function.

Figure 1:
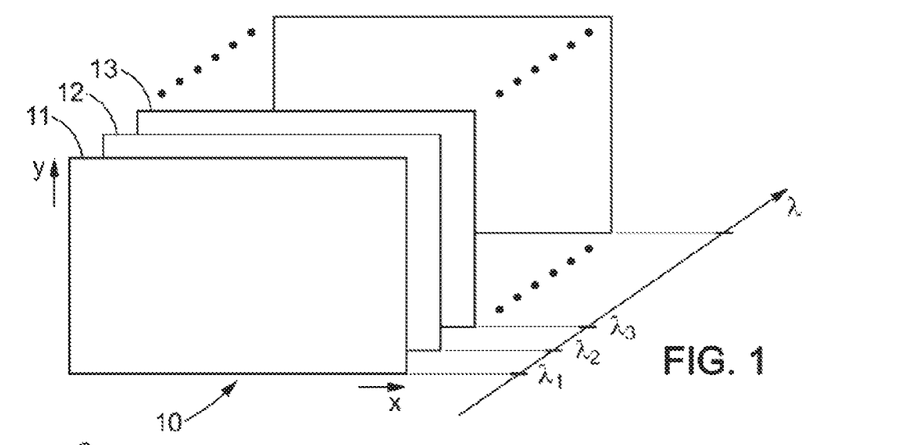
FIG. 1 is a schematic representation of a multispectral image.

In general, the reference 10 in FIG. 1 designates a multispectral image formed of several individual images 11, 12, 13, . . . that were simultaneously captured of the same scene. In other words, the individual images 11, 12, 13, . . . were captured by imaging means arranged in parallel, activated simultaneously, and having the same optical field of capture. However, each image 11, 12, 13, . . . was captured by selecting a portion of the radiation from the scene, which is distinct from the radiation portion used for each of the other images 11, 12, 13, . . . . This separation is performed based on the wavelength λ of the radiation, in a manner known to the skilled person, so that each of the images 11, 12, 13, . . . , called a spectral image, is captured with radiation of a wavelength within a distinct range, preferably without overlapping any of the ranges of the other spectral images. The number of spectral images 11, 12, 13, . . . may be arbitrary, for example equal to twenty spectral images, each associated with a wavelength range whose width may be between several nanometers and several tens of nanometers or more. Such a multispectral image may also be called hyperspectral, depending on the number of spectral images that compose it and the width of each of their wavelength ranges. For example, $\lambda_1, \lambda_2, \lambda_3, \ldots$ denote center values for the respective wavelength ranges of the spectral images 11, 12, 13, . . . . Depending on the application of the invention, these ranges may be between 400 nm (nanometer) and 1 μm (micrometer), or between 400 nm and 2.5 μm, for example.

Each spectral image 11, 12, 13, . . . may be processed for the invention from a file that is read from a storage medium, or from a digital stream that is produced by an image capturing device at a video stream rate. Depending on the case, the image data may be raw data produced by the sensor, or data already processed for certain operations such as cropping spectral images relative to one another, correction of over- or underexposure, etc.

Figure 2A:
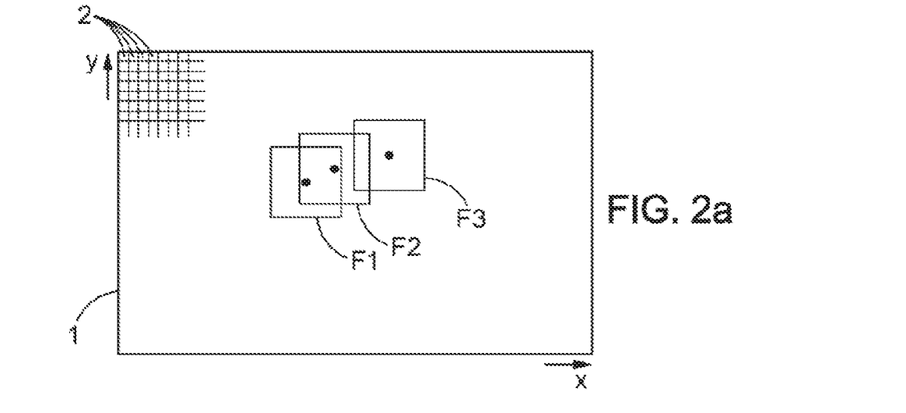
FIG. 2*a* represents a display screen used to implement the invention.

FIG. 2a shows a screen for displaying the multispectral image 10. It comprises a matrix 1 of image dots 2, or pixels 2, which are arranged at the intersections of the rows and columns of the matrix. For example, the matrix 1 may contain 500 columns and 500 rows of pixels 2. x and y respectively denote the direction of the rows and columns.

The multispectral image 10 is presented to an operator on the screen matrix 1 in the manner described now.

First, an initial representation of the scene is displayed on the matrix 1, which may be one of the spectral images corresponding to a wavelength range contained within the visible range of the human eye, or to a range within the infrared. Optionally, multiple spectral images in the visible range may be superimposed, such that the initial representation restores a perception of natural colors under daylight conditions. Alternatively, the initial representation may be a linear combination of multiple spectral images, using a linear combination formula which is fixed. The display of this initial representation is step S0 of FIG. 5a.

Figure 5A:
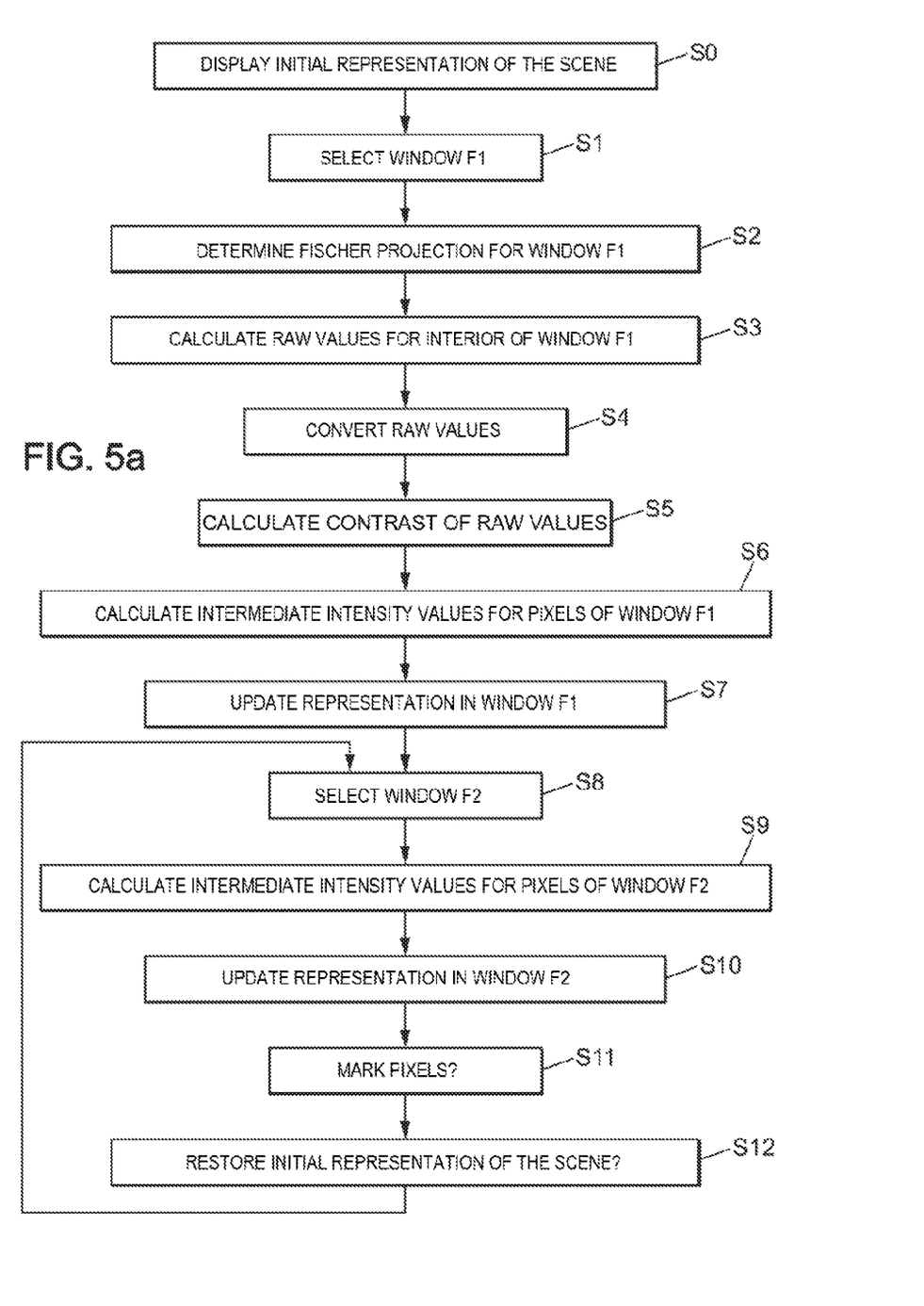
FIG. 5*a* is a flowchart of the steps of a method according to the invention.

In step S1, a window F1 is selected in the matrix 1, having smaller dimensions than the matrix. For example, the window F1 may be square and extend for 51 pixels in both the x and y directions. The multispectral image 10 is then displayed on the matrix 1 in a manner that is different within the window F1 and outside the window, providing a compromise between a facilitated positional identification within the image for the operator, a detection by the operator that is as effective as possible of intruding elements in the scene that is imaged, an improved viewing experience, and a presentation of successive multispectral images that can be performed in real time relative to the capture or reading of the images.

The position of the window F1 in the matrix 1 may be selected by the operator, for example using the mouse to indicate the center point of the window. In this case, the window size may have been fixed initially, for example based on an assumption concerning the size of the intruding element being searched for in the scene, and its supposed distance away. Preferably, all windows to be successively used in a same execution of the invention will have identical dimensions.

The initial representation of the multispectral image 10 on the matrix 1 is maintained outside the window F1, facilitating positional identification within the scene by the operator.

Figure 3:
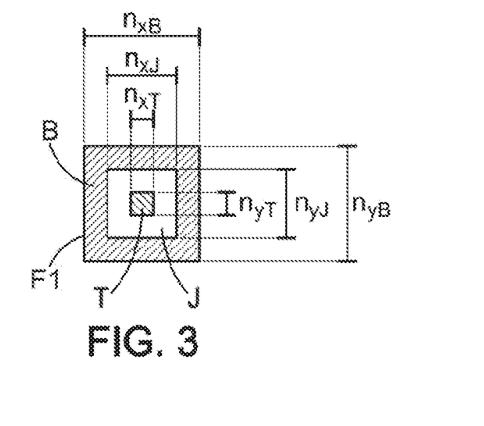
FIG. 3 shows a mask which can be used to calculate the contrast within a window in particular modes of implementation of the invention.

The display mode that is used for the multispectral image 10 within the window F1 encourages effective detection of intruding elements at that location in the scene, by exposing them. To do this, maximal contrast is desired between the content of the multispectral image in two separate areas of the window F1: a target area and a background area. For example, as represented in FIG. 3, the target area denoted by T and the background area denoted by B square may have respective perimeters which are square, concentric, and separated by an intermediate area denoted J. $n_{xB}$ and $n_{yB}$ denote the outer dimensions of the background area B in the x and y directions. They correspond to the dimensions of the window F1, for example each equal to 51 pixels. $n_{xT}$ and $n_{yT}$ denote the dimensions of the target area T in the x and y directions, for example each equal to 7 pixels, and $n_{xJ}$ and $n_{yJ}$ denote the outer dimensions of the intermediate area J, for example each equal to 31 pixels. As with $n_{xB}$ and $n_{yB}$, the values of $n_{xT}$, $n_{yT}$, $N_{xJ}$, and $n_{yJ}$ may be selected based on an assumption of the size of the intruding element searched for in the scene, and its supposed distance away.

The method of optimizing the contrast between the target area T and the background area B, within the window F1, which is now described, is known as the method by Fisher projection. It comprises determining the Fisher projection itself (step S2 of FIG. 5a) and applying it to the content of the multispectral image 10 in the window F1 (step S3). The results of the Fisher projections relating to the various windows are then brought to a common scale, for comparison.

Several spectral images 11, 12, 13, . . . are selected for displaying the portion of the multispectral image 10 that is contained in the window F1. k denotes the number of spectral images in this selection, and is greater than or equal to two. This selection of spectral images is constant for each execution of the invention, but may be varied for successive executions based on the same multispectral image 10. It may only include a small number of the spectral images 11, 12, 13, . . . composing the multispectral image 10, or all of them. Possibly, this selection may include one or more spectral images having wavelength ranges contained within the visible range of the human eye, even if they were already used for the initial representation.

The intensity values of each pixel 2 of the target area T and background area B, in the window F1, are used for the k spectral images selected. A vector of spectral intensities is then constructed for the target area T as follows: it has a separate coordinate for each of the spectral images selected, and this coordinate is equal to an average of the intensity values of all pixels of the target area T in this spectral image. The following vector can thus be constructed:

$$\vec{m}_T = \frac{1}{N_T} \begin{bmatrix} \sum_{i \in T} I_{n1}(i) \\ \sum_{i \in T} I_{n2}(i) \\ \vdots \\ \sum_{i \in T} I_{nk}(i) \end{bmatrix}$$

where i is an index which numbers the pixels in the target area T, n1, n2, . . . , nk are the values of an integer index that identifies the k spectral images selected, and $I_{n1}(i)$, $I_{n2}(i)$, ..., $I_{nk}(i)$ are the intensity values of pixel i in the respective spectral images n1, n2, ..., nk. $N_T$ is a division coefficient of the vector, which may be equal to the number of pixels in the target area T, or may be chosen so that the vector has a standard value equal to the unit value. In a space of intensities for the k spectral images selected, the vector $m_T$ corresponds to an average position of the vectors of spectral intensities of all pixels in the target area T. Alternatively, other modes for calculating the average value may be used, for example with weighting coefficients. Another vector of spectral intensities is constructed in a similar manner for the background area B:

$$\vec{m}_B = \frac{1}{N_B} \begin{bmatrix} \sum_{i \in B} I_{n1}(i) \\ \sum_{i \in B} I_{n2}(i) \\ \vdots \\ \sum_{i \in B} I_{nk}(i) \end{bmatrix}$$

where the division coefficient $N_B$ is calculated in the same manner as coefficient $N_T$, but with replacing the pixels of the target area T by those of the background area B, which are different in number in most implementations of the invention although this is not necessary. The vector $m_B$ corresponds in the same manner to an average position of the vectors of spectral intensities of all pixels in the background area B. Vectors $m_T$ and $m_B$ are arranged in columns and each has k coordinates.

We also construct the following covariance matrix from the intensity values of the pixels 2 of the background area B:

$$Co\ var_B = \begin{bmatrix} Var(I_{n1}, I_{n1}) & Co\ var(I_{n2}, I_{n1}) & \cdots & Co\ var(I_{nk}, I_{n1}) \\ Co\ var(I_{n1}, I_{n2}) & Var(I_{n2}, I_{n2}) & \cdots & Co\ var(I_{nk}, I_{n2}) \\ \vdots & \vdots & \ddots & \vdots \\ Co\ var(I_{n1}, I_{nk}) & Co\ var(I_{n2}, I_{nk}) & \cdots & Var(I_{nk}, I_{nk}) \end{bmatrix}$$

where Var $(I_{n1}, I_{n1})$ denotes the variance of the spectral image n1 intensity values calculated on the pixels of the background area B, Covar $(I_{n1}, I_{n2})$ denotes the covariance of the respective intensity values of the spectral images n1 and n2 calculated on the pixels of the background area B, etc., for all pairs of index values selected from among n1, n2, ..., nk. The matrix $Covar_B$ is square and of size k.

Figure 4:
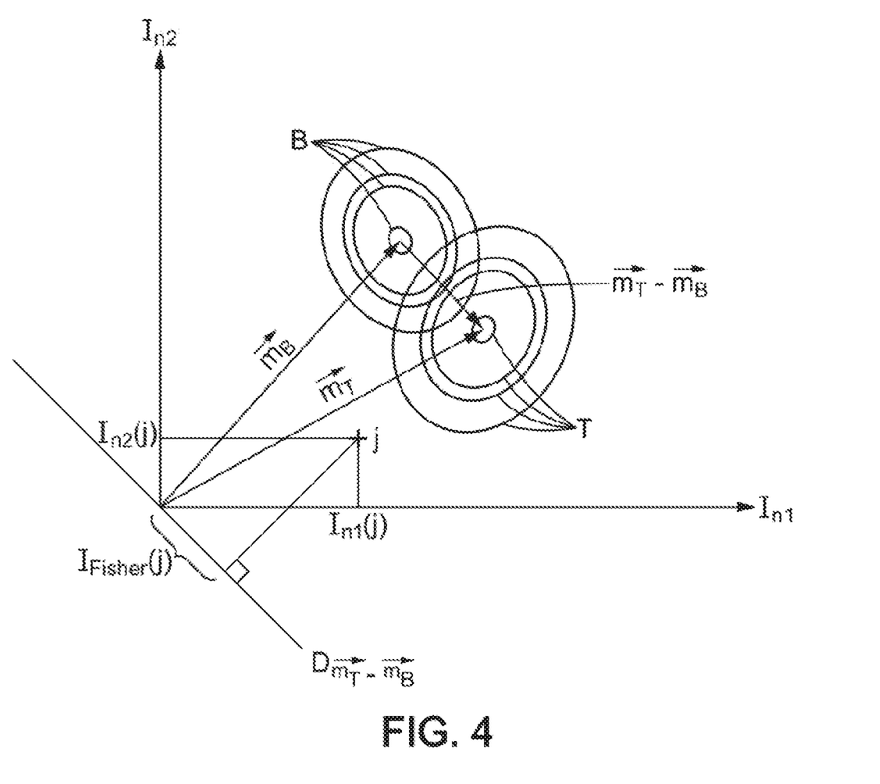
FIG. 4 shows the principle of a Fisher projection in the space of spectral intensities.

The Fisher projection $P_{Fisher}$ is then determined as follows:

$$P_{Fischer} = (\vec{m}_T - \vec{m}_B)^t \cdot Co\ var_B^{-1}$$

where the superscript t denotes the transpose of a vector, the exponent −1 denotes the inverse of a matrix, and · denotes the matrix product operation, here applied between the line vector $(m_T - m_B)^t$ and the matrix $Covar_B^{-1}$. The Fisher projection expressed in this manner is a line vector of k coordinates. It is applied to the vector of spectral intensity values of each pixel of the window F1 in the form of the following matrix product:

$$I_{Fischer}(j) = P_{Fischer} \cdot \begin{bmatrix} I_{n1}(j) \\ I_{n2}(j) \\ \vdots \\ I_{nk}(j) \end{bmatrix}$$

where j refers to any pixel in the window F1, and $I_{Fisher}(j)$ is the intensity value for pixel j which results from the Fisher projection applied to the vector of intensity values for the same pixel j in the k spectral images of the selection. In the terminology of the skilled person, the projection $P_{Fisher}$ that is determined for the selected window is called the Fisher factor, and the set of intensity values $I_{Fisher}(j)$ obtained for all pixels j of the window is called the Fisher matrix. FIG. 4 illustrates the Fisher projection in the space of spectral intensities, for the case of two selected spectral images: k=2. The references introduced above are used again in this figure. The concentric ellipses that are denoted T and B symbolize contour lines associated with constant values for the number of pixels in the target area T and in the background area B. The projected intensity $I_{Fisher}(j)$ has been called the raw projection value in the general description of the invention, or more simply the raw value. $D_{mT-mB}$ is the direction in which are projected the vectors of spectral intensities of the pixels, according to the Fisher process.

These raw values are then converted in step S4, to adjust the amplitude of their variations within the window F1. For example, an affine transformation of the raw values can be determined and applied, so that the smallest among these raw values becomes equal to the lower bound of a predetermined interval, and the largest among the same raw values becomes equal to the upper bound of the same interval. This interval thus fixes the dynamics of variations in the converted raw values. For example, the raw values converted in this manner can be distributed between 0 and 255, rounded to integer values.

A contrast C is then calculated in step S5, from the raw values $I_{Fisher}(j)$ within the window F1. This contrast may be calculated as follows, to evaluate the difference in the rendering of the raw values between the target area T and the background area B:

$$C = \frac{\left| \frac{1}{N_T} \sum_{j \in T} I_{Fisher}(j) - \frac{1}{N_B} \sum_{j \in B} I_{Fisher}(j) \right|}{\sigma_{j \in B}(I_{Fisher}(j))}$$

where |·| indicates the absolute value and $\sigma_{j \in B}$ indicates the standard deviation calculated for the pixels in the background area B.

An intermediate intensity value is then calculated in step S6 for each pixel 2 of the window F1, by multiplying the raw then converted intensity value of that pixel by the contrast value C. Intermediate intensity values which are thus obtained for a same pixel 2 of the matrix 1 but for different windows containing that pixel can then be compared in a significant manner.

The display of the multispectral image 10 on the matrix 1 is then updated in step S7, as a mixed representation of the scene. The display outside the window F1 is maintained using the initial representation described above, for example with colors that reproduce natural vision in daylight conditions. Within the window F1, the display is updated for each pixel in accordance with the intermediate intensity value obtained for this pixel and for the window F1. The representation of the scene that is presented to the operator therefore becomes composite, or heterogeneous, in the display modes that are used outside and inside of the window F1. The display mode by Fisher projection that is used within the window F1 allows revealing intruding elements present in the scene that is imaged, at the location of the window.

According to one refinement of the invention, the representation of the scene may be updated differently within the window F1 depending on whether the intermediate intensity value of a pixel is greater than or equal to a threshold calculated for the window, or on the contrary is lower than this threshold. Such a threshold may be a fixed fraction, for example a fourth, of an average value of the intermediate intensity values in the window F1. Such a threshold has been called a second threshold in the general description of the invention. If the intermediate intensity value of a pixel is greater than or equal to the second threshold, then it is used to replace the intensity value of that same pixel in the initial representation, as already indicated. Otherwise, according to this refinement, it is used to apply a brightening level to the pixel as displayed in the initial representation. This brightening level may be determined as a function of the intermediate intensity value, for example by using a table that maps between intermediate intensity values and brightening values. Such brightening values may correspond to the alpha channel of a pixel. Thus the representation of the scene may be brightened at most points of the window F1, so that the operator is better able to see, on the screen, the trace of that window superimposed on the initial representation. This initial representation is still visible in at least a portion of the window F1, so that the operator can still discern pattern outlines in the scene within this window. Thus, the operators ability to visually interpret the representation of the scene is also partially preserved within the window F1.

Another window, denoted F2 in the figures, is then selected in place of window F1 in step S8. Windows F1 and F2 are preferably but not necessarily of the same dimensions. When their dimensions are the same, each window can be selected by the position of its center point in the matrix 1, as shown in FIG. 2a. The mask for the contrast calculation which is used in window F2 may be identical to the one used in window F1, comprising the target area T, the intermediate area J, and the background area B. F3 denotes yet another window selected after window F2.

The position of each window may be manually selected in the matrix 1 by the operator (FIG. 2a), in a simple manner.

Figure 2B:
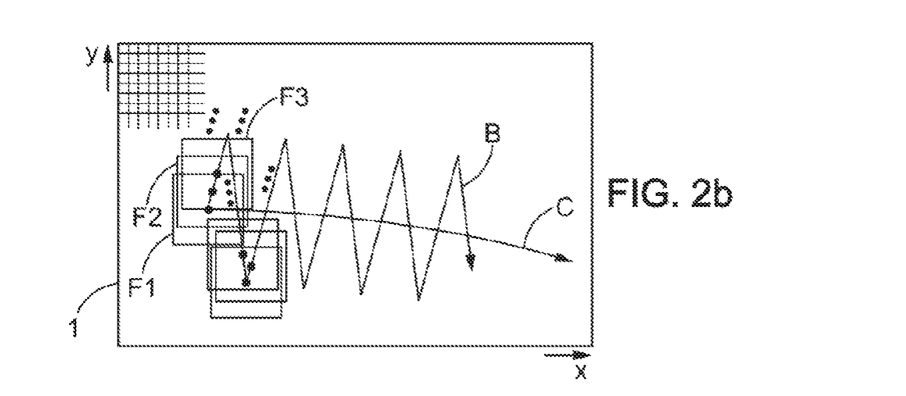
FIGS. 2*b* to 2*d* show windows that are selected according to three types of preferred sequences.

Alternatively, the operator may designate a path of travel in the matrix 1, and a computer module can determine successive windows having centers located on a track which zigzags or meanders to each side of the path of travel. The path of travel may itself be straight, but is generally curved. The references C and B in FIG. 2b respectively denote the path of travel designated by the operator and the zigzag track indicating the successive centers of the windows.

Optionally, the operator may directly designate the successive windows, such that their centers are located on a track which zigzags or meanders, possibly with the track running back and forth on itself.

Figure 2C:
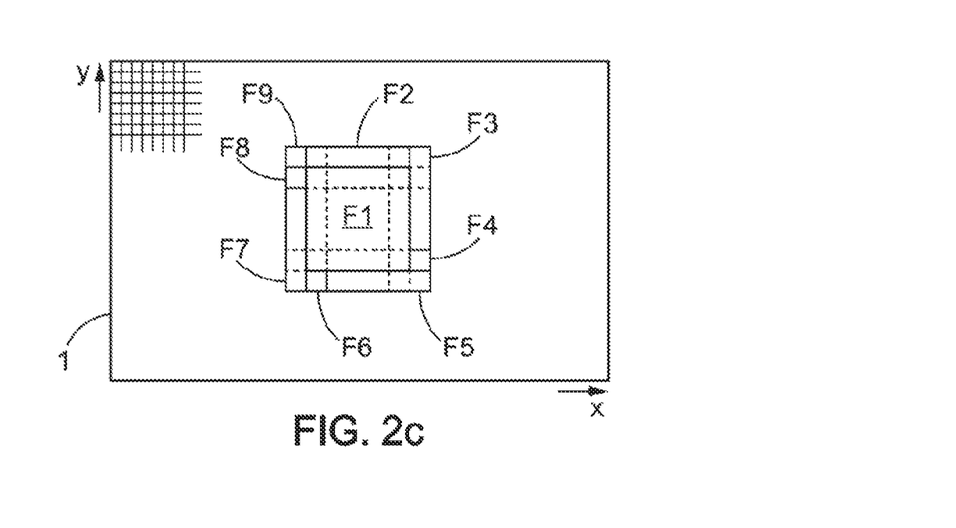
Figure 2D:
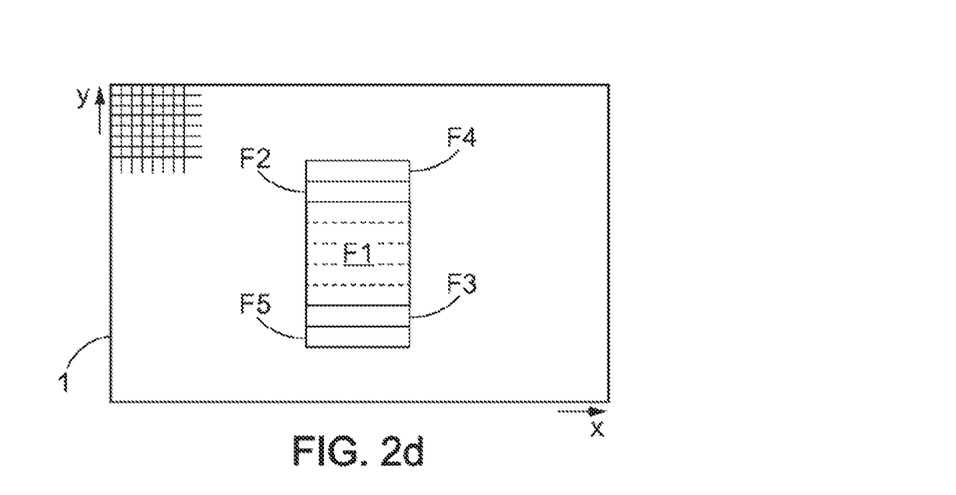

In another alternative, window F2 and several subsequent windows may be automatically selected on the basis of window F1. For example, in accordance with FIG. 2c, successive windows F2 to F9 are offset to window F1 such that the target areas T within each window F2 to F9 has a side or corner contiguous with the target area T in window F1. According to yet another possibility, four windows may be selected automatically after window F1, forming a stack along the y direction, as represented in FIG. 2d. In this case, windows F2 to F5 are offset in the y direction such that the target areas T which are respectively associated with these windows have target areas with contiguous paired sides parallel to the x direction.

Intermediate intensity values are then calculated for each pixel of window F2 in step S9, in the same manner as for window F1 in steps S2 to S6.

The invention is useful when some of the serially selected windows overlap, without two overlapping windows necessarily being chronologically successive in the window selection.

The representation already being displayed on the matrix 1 is not modified for pixels that are not part of window F2.

The processing of pixels that are part of window F2 is different depending on whether they were already part of window F1. If a pixel of window F2 was not part of window F1, its current value is updated as already described above for window F1, but using the intermediate intensity value that was calculated for this pixel and for window F2. In the opposite case, where a pixel is common to both windows F1 and F2, its current intensity value is updated in the manner now described. The intermediate intensity value which was calculated for this pixel in the context of processing window F2 is combined with the intermediate intensity value which was calculated for the same pixel in the context of processing window F1, applying an operation of combining intensity values, defined above. Then, the result of the combination is used in step S10 for the updated representation of the scene presented to the operator.

In preferred implementations of the invention, said combination may consist of selecting the larger of the two intermediate intensity values. Thus, if the intermediate intensity value of a pixel common to windows F1 and F2, resulting from processing window F2, is greater than the intermediate intensity value resulting from processing window F1, then the newly obtained value is used for the updated display. Otherwise, the value already in use in the current display for that pixel is maintained.

Figure 5B:
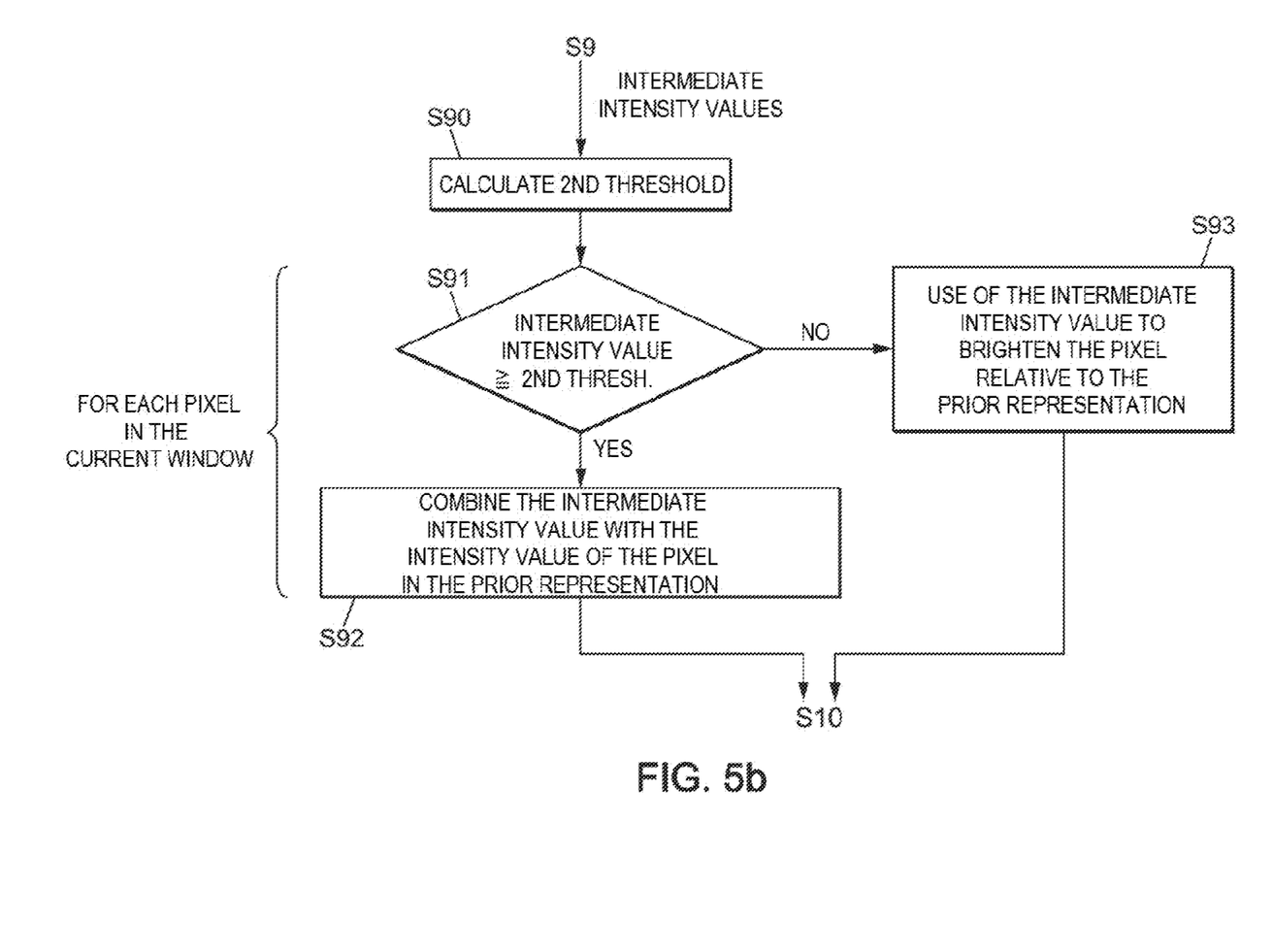
FIG. 5*b* details a step of the method of FIG. 5*a*.

The improvement consisting of taking into account the intermediate intensity value by brightening the intensity value in use in the current display until that time, when this intermediate intensity value is less than the second threshold, can be applied when processing window F2. FIG. 5b illustrates this improvement. First, the value of the second threshold is updated by recalculating it for window F2, in the same manner as indicated above for window F1 (step S90). Then, when a pixel of window F2 has an intermediate intensity value which is lower than the recalculated value of the second threshold, the intermediate intensity value can be used as a brightening level applied to the prior intensity value of the same pixel (steps S91 and S93). Such brightening is applied when the prior intensity value was already an intermediate intensity value, as well as when it was an intensity value retained from the initial representation. Step S92 corresponds to the case were the new intermediate intensity value is greater than or equal to the second threshold. It is carried out in a manner identical to what is implemented without the brightening improvement, for low intermediate intensity values.

The sequence of steps S8 to S10 is repeated each time a new window is selected. The window selection methods described with reference to FIGS. 2a to 2d can be repeated for each new window.

The invention gradually reveals elements with a contrast that increases, in the representation of the scene that is presented to the operator, as additional windows are used. This increase in contrast is retrieved from the information the multispectral image contains beyond the representation displayed at a given moment. In addition, elements of the scene that are thus revealed at a given moment are now retained in successive updates to the representation.

Simultaneously, the current representation also shows the windows that have been previously selected, to assist the operator as he or she monitors the scene in progressive scans. Previously selected windows form lighter areas in the representation that is displayed, and elements that have been revealed by Fisher projection appear even more vividly in these areas. In other words, the representation of the scene retains an afterimage of elements revealed in any of the previous windows, as well as an afterimage of the positions of all previous windows.

One advantage of the invention lies in the fact that no history of successive updates to the representation must be stored. A new update can be built based only on the previous one and on the result of the Fisher projection in the last window selected.

Optionally, some of the pixels in the current window may be marked (step S11 of FIG. 5a). Such marking is done in response to a special command entered by the operator, called a first command in the general description of the invention. It allows indicating in an even more apparent and possibly permanent manner, in the successive representations displayed, the pixels of high intensity. For example, these pixels may be displayed with a predetermined saturated color. The pixels in the current window that are thus marked may be those which have a display intensity above a threshold, called the first threshold in the general description of the invention. This first threshold may be initially fixed, or may be determined based on the distribution of the intermediate intensity values in the current window. Alternatively, the marking may be limited to those pixels having an intensity which results or which has resulted at least once from an application of the combination operation, to indicate that they were exposed by Fisher projection.

Also optionally, the representation which is displayed on the screen may be reset in response to a second command entered by the operator (step S12). The initial representation is displayed once again and the method of the invention is resumed using the restored original representation, but with the window currently selected. Such a reset erases afterimages of previous windows and of elements of the scene that were exposed in some of these windows, when the updated representation has become overloaded and confusing. Advantageously, pixels deliberately marked by the operator using a first command may remain marked during a reset.

It is understood that the invention may be implemented by modifying various aspects of the embodiments which have been detailed above.

In particular, the combination operation that is used to update the intensity value of a pixel may be other than selecting the largest of the two intensity values being compared. For example, the new combination value may be a function of the standard deviation of the intensity values of the pixel concerned in the successive representations, or only some of them, particularly those for which the pixel is inside the windows selected for these representations. Such use of the standard deviation makes it possible to highlight elements of the scene that are only exposed when the selected window is placed at their location in the image.

The invention claimed is:
1. Method for the viewing, by an operator, of a multispectral image formed of a plurality of spectral images of a same scene that were captured at a same moment in separate respective spectral ranges, the method comprising the following successive steps:

/1/ defining a combination operation for combining two intensity values to produce a new intensity value resulting from the combination;

/2/ on a screen comprising a matrix of pixels presented to the operator, displaying a representation of the scene consisting of initial intensity values respectively assigned to all the pixels of the matrix, and which are obtained on the basis of at least one of the spectral images;

/3/ for a first window which is smaller than the matrix, and for a selection of several spectral images, determining a Fisher projection from the initial intensity values of the selected spectral images, said Fisher projection being determined in order to optimize a contrast of a linear combination of spectral images of the selection within the first window;

/4/ for each pixel within the first window, calculating an intermediate intensity value by performing the following sub-steps:

/4-1/ applying the Fisher projection determined in step /3/ to the portions of the selected spectral images which are contained in the first window, so as to obtain a raw projection value for each pixel of said first window; then /4-2/ converting the raw projection values obtained in sub-step /4-1/, using a monotonic conversion function, such that a smallest and largest value among said raw projection values are respectively equal to a lower bound and an upper bound of a fixed interval;

/4-3/ calculating a contrast within the first window from the raw values obtained in sub-step /4-1/; then /4-4/ for each pixel within said first window, calculating the intermediate intensity value by multiplying the converted raw value obtained in sub-step /4-2/ for said pixel, by the contrast obtained in sub-step /4-3/;

/5/ updating the representation of the scene that is displayed on the screen by replacing, for at least some of the pixels contained in the first window, the initial intensity value by the intermediate intensity value calculated in step /4/;

/6/ repeating steps /3/ and /4/ for a second window which is smaller than the matrix, different from the first window and having pixels in common therewith, and for the same selection of spectral images; and /7/ once again updating the representation of the scene which is displayed on the screen, in the following manner, based on the representation obtained at the end of step /5/:

/7-1/ for at least some of the pixels within the second window but not part of any previously selected window: replacing the initial intensity value by the intermediate intensity value calculated in step /6/;

/7-2/ for at least some of the pixels within the second window but which are also part of at least one previously selected window: replacing the initial or intermediate intensity value which has been used in step /5/ for updating the representation of the scene, by the new intensity value resulting from the combination operation applied to said initial or intermediate intensity value used in step /5/ and to the intermediate intensity value calculated in step /6/; and /7-3/ for each pixel outside the second window: keeping the initial or intermediate intensity value which has been used in step /5/ for updating the representation of the scene, the combination operation for the intensity values being defined in step /1/ so that the representation of the scene which is obtained in step /7/ contains a trace of the representation of said scene as resulting from the prior execution of step /5/, including a visibility of the position of the first window and of image elements revealed in said first window.

2. Method according to claim 1, wherein the combination operation is defined in step /1/ such that the new intensity value is equal to the larger of the two intensity values which are combined.

3. Method according to claim 1, wherein each spectral image used in step /2/ to obtain the initial intensity values corresponds to a spectral range which is contained within a range of sensitivity of the human eye.

4. Method according to claim 3, wherein a plurality of spectral images are used in step /2/, such that the representation of the scene displayed in step /2/ corresponds to color vision of the human eye in daylight conditions.

5. Method according to claim 1, further comprising a plurality of successive repetitions of the sequence of steps /6/ and /7/, with windows that change between two successive repetitions, step /6/ being repeated each time using the same spectral images selected, and the representation of the scene being updated in step /7/ of each current repetition based on the representation of the scene as obtained at the end of step /7/ executed during the previous repetition, and using the intermediate intensity values of step /6/ of said current repetition.

6. Method according to claim 5, wherein the windows that are used for the successive repetitions of the sequence of steps /6/ and /7/ are each determined by the operator who is watching the screen.

7. Method according to claim 5, wherein at least some of the windows that are used for the successive repetitions of the sequence of steps /6/ and /7/ are automatically selected on each side of a path of travel within the matrix, determined by the operator who is watching the screen.

8. Method according to claim 5, wherein some of the windows that are used for the successive repetitions of the sequence of steps /6/ and /7/ are determined by the operator, and for each window determined by the operator, the sequence of steps /6/ and /7/ is also repeated for eight additional windows arranged in the matrix such that target areas respectively located within said eight additional windows have a side or corner that is contiguous with a target area in said window determined by the operator.

9. Method according to claim 5, wherein some of the windows that are used for the successive repetitions of the sequence of steps /6/ and /7/ are determined by the operator, and for each window determined by the operator, the sequence of steps /6/ and /7/ is also repeated for four additional windows aligned with said window determined by the operator along a column direction of the matrix, so as to form a stack of contiguous windows distributed symmetrically on either side of said window determined by the operator, and such that the target areas respectively located within said windows of the stack form contiguous pairs.

10. Method according to claim 5, wherein a portion of the pixels in the window being used for the current repetition of the sequence of steps /6/ and /7/ is marked in response to a first command entered by the operator.

11. Method according to claim 10, wherein the pixels that are marked in response to the first command are displayed with a predetermined color.

12. Method according to claim 10, wherein the pixels that are marked in response to the first command are the pixels, contained in the window being used for the current repetition of the sequence of steps /6/ and /7/, which have intensity values greater than a first threshold in the representation of the scene as updated at the end of said current repetition of the sequence of steps /6/ and /7/.

13. Method according to claim 5, wherein the representation of the scene displayed in step /2/, with the initial intensity values, is displayed once again in response to a second command entered by the operator, and then the viewing method is resumed starting with step /3/.

14. Method according to claim 13, wherein a portion of the pixels in the window being used for the current repetition of the sequence of steps /6/ and /7/ is marked in response to a first command entered by the operator, and wherein the representation of the scene displayed in step /2/ is displayed once again and the viewing method is resumed starting with step /3/ after the second command, while preserving a prior marking of pixels performed earlier in response to the first command.

15. Method according to claim 1, wherein, in step /5/ and in sub-step /7-1/, the initial intensity value is replaced by the intermediate intensity value if said intermediate intensity value is greater than a second threshold adopted for the current window, otherwise the initial intensity value is maintained but is affected by a level of transparency that is determined based on said intermediate intensity value; and in sub-step /7-2/, the new intensity value resulting from the combination is used for the replacement if said new intensity value is greater than the second threshold, otherwise the intensity value resulting from the previous repetition of the sequence of steps /6/ and /7/ is maintained but is affected by a level of transparency that is determined based on said new intensity value.

16. Method according to claim 15, wherein the second threshold is determined from a statistical evaluation of the intermediate intensity values for pixels that are part of a background area in the window used for the current repetition of the sequence of steps /6/ and /7/.

17. Device for viewing a multispectral image formed of a plurality of spectral images of a same scene, which are associated with separate spectral intervals, the device comprising:

means for storing the multispectral image;

a screen comprising a matrix of pixels;

an image processing system, configured to combining intensity values assigned to the pixels in each spectral image;

a control system configured to displaying on the screen a representation of the scene produced by the image processing system; and a system for selecting a window in the matrix, said window being smaller than said matrix, the device being configured to implementing a viewing method according to claim 1.

18. Computer program product, comprising program instructions stored on a non-transitory medium readable by one or more processors and configured to cause said one or more processors to execute a viewing method according to claim 1.

* * * * *